United States Patent [19]

Burt

[11] Patent Number: 4,720,225

[45] Date of Patent: Jan. 19, 1988

[54] THREADED FASTENING SYSTEMS

[75] Inventor: David A. Burt, Berkshire, England

[73] Assignee: ITW Limited, Basingstoke, Great Britain

[21] Appl. No.: 931,716

[22] Filed: Nov. 17, 1986

[30] Foreign Application Priority Data

Nov. 28, 1985 [GB] United Kingdom ............... 8529274

[51] Int. Cl.⁴ ............................................ F16B 39/32
[52] U.S. Cl. .................................... 441/329; 411/311; 411/908
[58] Field of Search ............ 411/7, 316, 317, 326–329, 411/311, 386, 908, 417

[56] References Cited

U.S. PATENT DOCUMENTS

| 879,714 | 2/1908 | Abe | 411/329 |
|---|---|---|---|
| 1,211,391 | 1/1917 | Blackwelder | 411/329 |
| 2,015,159 | 9/1935 | Rosenberg | 411/386 |
| 2,484,645 | 10/1949 | Baumle | 411/311 |
| 3,711,138 | 1/1973 | Davis | 411/409 |
| 4,478,545 | 10/1984 | Mizusawa et al. | 411/908 |

OTHER PUBLICATIONS

IBM Technical Disclosure Bulletin, vol. 20, No. 6, Nov. 1977 (1 sheet, 3 Figures).

Primary Examiner—Neill Wilson
Attorney, Agent, or Firm—J. P. O'Brien; T. W. Buckman

[57] ABSTRACT

The system comprises an at least partially threaded male member of plastics material including one or more first discontinuities, such as a bolt with a plurality of substantially rigid webs between portions of a helical rib thereon, and an at least partially threaded female member of plastics material including one or more second discontinuities, such as a nut with a resiliently deflectable tongue whose free end is located beyond one end of the helical rib therein.

Threaded advance of the male member, relative to the female member, causes deflection and resilient return of the first and/or second discontinuities as they pass one another, such as deflection and resilient return of the tongue as it passes each of the webs, to give an audible click and an abrupt change in drive torque or other tangible indication of the extent of said threaded advance.

2 Claims, 4 Drawing Figures

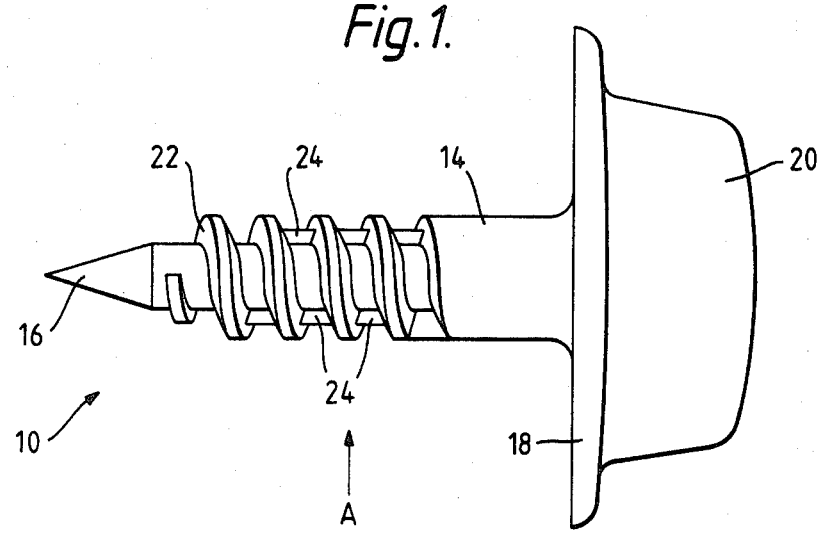
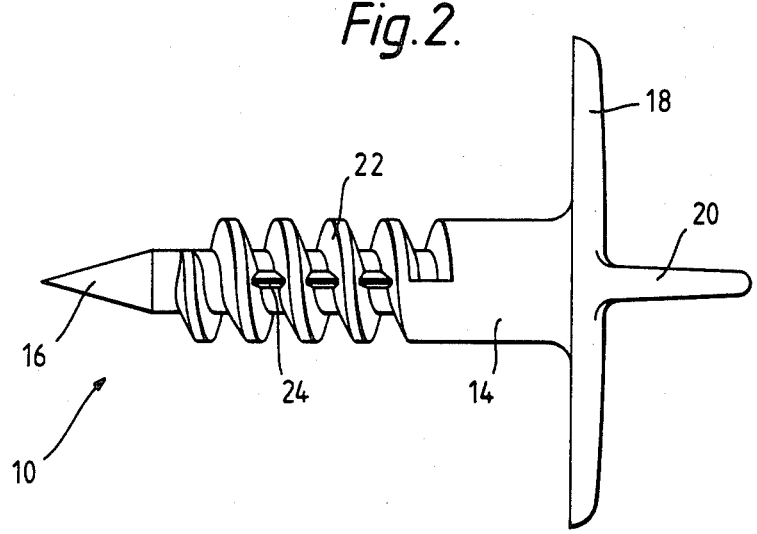

THREADED FASTENING SYSTEMS

The present invention relates to threaded fastening systems and is particularly, but not exclusively, concerned with facilitating avoidance of damage to workpieces, such as delicate articles and packaging materials, to be secured by threaded fastening systems.

Many efforts have been made in the past to avoid overtightening a male member relatively to a female member in a threaded fastening system. These efforts have usually included the use of torque-responsive drive tools. Typically, when the drive tool experiences a sufficient increase in the torque necessary to produce further advance of the male member relatively to the female member, a clutch operates to disconnect the drive tool.

There is the difficulty, however, that torque-responsive drive tools are not appropriate when the workpieces to be secured are easily crushed, or otherwise easily damaged. This can happen, as an example, when securing superimposed layers of corrugated cardboard. The layers of cardboard may be crushed to an undesirable extent before there is a sufficient increase in torque to disconnect the drive tool. Other examples are in clamping together: corrugated multi-ply sheeting to form structures which may or may not be re-useable; expanded polystyrene sheets whose insulation properties may be utilised in, for example, the building industry; and plastics corrugated sheeting to form trays, or other packages, for use in the transportation of moist items, such as fish.

In some applications, it may be desirable for advance of the male members relatively to the female members to stop even before they have contacted the workpieces so that there is no increase in torque at all. Here, it has been the usual practice to tighten the threaded fastening systems by hand and rely on visual inspection.

According to the present invention, in contrast, a threaded fastening system comprises an at least partially threaded male member of plastics material including one or more first discontinuities, and an at least partially threaded female member of plastics material including one or more second discontinuities, the arrangement being such that threaded advance of the male member relatively to the female member causes deflection and resilient return of the first and/or second discontinuities as they pass one another, to provide a tangible indication of the extent of said threaded advance.

When the first and second discontinuities pass, there may be a click which can be heard (or sensed by a sensor) and there will in any event be an abrupt change in the torque resisting the threaded advance which can be felt (or sensed by a sensor).

The relative positions of the male and female members can be calculated by counting the clicks or counting the abrupt changes in torque.

When the threaded advance has proceeded to the desired extent, tightening by hand is stopped, or a drive tool is disconnected either manually or automatically (if controlled by sensor-responsive counting means).

Preferably, there is a plurality of the first discontinuities and there is one of the second discontinuities.

Although the male and female members may be formed with spaced-apart protrusions defining partial or incomplete threads, preferably the male member includes a helically-extending rib forming a first thread of more than one pitch in length, and the female member includes a helically-extending rib forming a second thread of less length than the first thread.

Preferably, the first discontinuities are substantially rigid webs located between portions of the helically-extending rib on the male member, and the second discontinuity is a resiliently deflectable tongue located beyond one end of the helically-extending rib on the female member.

In the above noted preferred instance, each of the first and second discontinuities is formed as a protuberance. It is possible, however, for either the first or second discontinuities to be formed as depressions, provided that the second or first discontinuities are formed as resiliently deflectable protuberances. It will be appreciated that regardless of whether two protuberances pass, or a protuberance passes a depression, there is an abrupt change in the torque resisting the threaded advance. There may also in each case be an audible click.

If each of the first and second discontinuities is formed as a protuberance, it is necessary for only the first or second discontinuities to be resiliently deflectable, but each of the first and second discontinuities could be resiliently deflectable if desired.

Preferably, the male member is formed as a bolt, having a threaded shank and an outwardly projecting head including drive inducing surfaces, and the female member is formed as a nut including drive inducing surfaces.

Preferably, an end of the threaded shank remote from the head is pointed.

A threaded fastening system, in accordance with the present invention, will now be described, by way of example only, with reference to the accompanying drawings, in which:

FIG. 1 is a side view of a male member forming part of the threaded fastening system of the present invention;

FIG. 2 is a view taken in the direction of the arrow A of FIG. 1;

Figure 3:
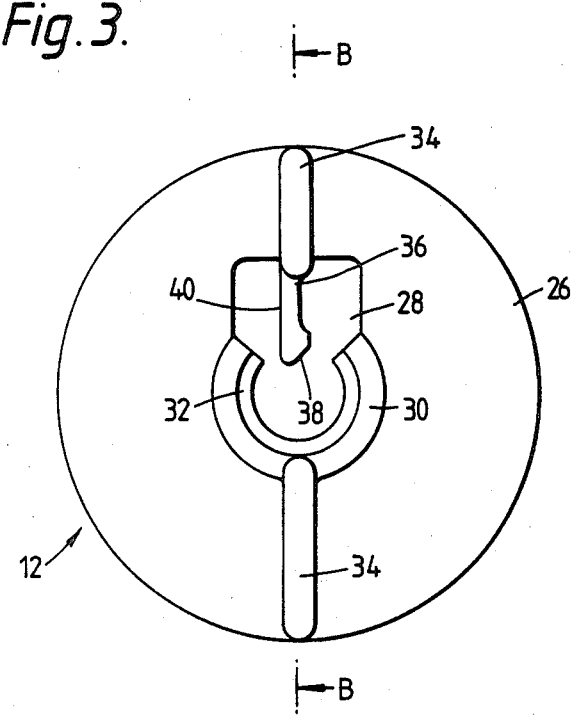
FIG. 3 is a front view of a female member forming part of the threaded fastening system of the present invention.
Figure 4:
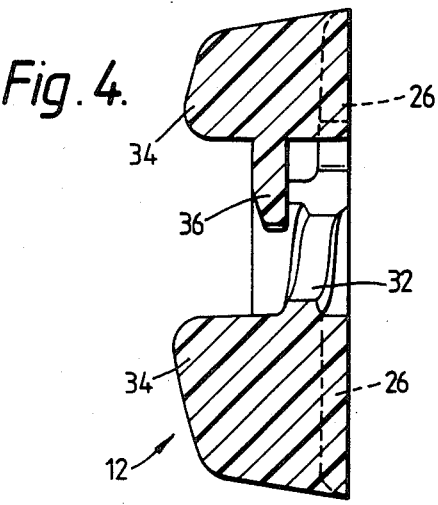
FIG. 4 is a cross-section taken along the line B—B of FIG. 3.

The accompanying drawings illustrate a threaded fastening system, in accordance with the present invention, including a male member constituted by a bolt 10 of plastics material, and a female member constituted by a nut 12 of plastics material.

The bolt 10 is formed in one piece and comprises a shank 14 having a point 16 at one end and an outwardly projecting head 18 at its other end. The point 16 allows the bolt 10 to be pierced through workpieces formed of for example an expanded plastics material or cardboard. The head 18 includes a typical drive inducing surfaces shown as the opposed flat faces of a plate 20. A rib 22 extends helically along a major part of the length of the shank 14 to form a thread. The rib 22 is shown as being of over four pitches in length. Six substantially rigid webs 24 are located between portions of the rib 22 and constitute a plurality of first discontinuities.

The nut 12 is formed in one piece and comprises a washer 26 having an opening 28 therethrough. Part of the opening 28 is bounded by a wall 30 whose inner surface has a rib 32 extending helically therealong to form a thread of less than one pitch in length. A pair of wings 34, forming typical drive inducing surfaces, also project from the washer 26. One of the wings 34 carries a resiliently deflectable tongue 36 whose free end is located beyond one end of the rib 32. The tongue 36 constitutes a second discontinuity.

During threaded advance of the bolt 10 into the nut 12, it is a tapered face 38 of the tongue 36 which first meets each successive one of the webs 24. After the tapered face 38 has been deflected over one of the webs 24, it returns resiliently to its initial unstressed condition. This gives a loud audible clicking sound. The passage of the tongue 36 passed each of the webs 24 also gives a tangible indication in the form of a series of abrupt changes in the torque resisting the threaded advance. It is thus possible, by counting the clicks or changes in torque, to know the position of the bolt 10 relatively to the nut 12. More particularly, it is possible to avoid damaging a delicate article or packaging material sandwiched between the washer 26 of the nut 12 and the head 18 of the bolt 10.

The webs 24 also act to resist loosening of the bolt 10 with respect to the nut 12, for example as a result of shaking during transit. To increase this resistance to loosening a face 40 of the tongue 36 need not be tapered. Indeed, the opposite faces of each of the webs 24 could also be arranged to extend at different angles. Nevertheless, the arrangement is preferably such that the bolt 10 can be totally unthreaded from the nut 12 when desired to allow the possibility of re-use.

I claim:

1. A threaded fastening system comprising a bolt of plastics material including a helically-extending rib forming a thread of more than one pitch in length, a plurality of substantially rigid webs being located between portions of the helically-extending rib on the bolt to form first discontinuities, and further comprising a nut of plastics material including a helically-extending rib forming a thread with a resiliently deflectable tongue being located beyond one end of the helically-extending rib on the nut to form a second discontinuity, the arrangement being such that threaded advance of the bolt relatively to the nut causes deflection and resilient return of the second discontinuity as it passes each of the first discontinuities, thereby providing a tangible indication of the extent of said threaded advance.

2. A threaded fastening system comprising a threaded male member of plastics material having a plurality of first discontinuities and a threaded female member of plastics material including a second discontinuity, the relationship being such that threaded advance of the male member relatively to the female member causes deflection and resilient return of said one discontinuity of said first and second discontiniuties as they pass one another to provide a tangible indication of the extent of said threaded advance, a helically-extending rib forming a first thread of more than one pitch in length, and said female member includes a helically-extending rib forming a second thread of less length than the first thread, a plurality of said first discontinuities formed as substantially rigid webs located between portions of the helically-extending rib on the male member, and said second discontinuity formed as a resiliently deflectable tongue located beyond one end of the helicallyextending rib on the female member, said male member being formed as a bolt having a threaded shank and having an outwardly projecting head including drive inducing surfaces, and the female member being formed as a nut including drive inducing surfaces, and the end of the threaded shank remote from the head being pointed.

* * * * *